(12) United States Patent
Edelson

(10) Patent No.: US 8,258,665 B2
(45) Date of Patent: Sep. 4, 2012

(54) MOTOR WINDING

(75) Inventor: Jonathan Sidney Edelson, Portland, OR (US)

(73) Assignee: Borealis Technical Limited (GI)

( * ) Notice: Subject to any disclaimer, the term of this patent is extended or adjusted under 35 U.S.C. 154(b) by 341 days.

(21) Appl. No.: 11/792,967

(22) PCT Filed: Dec. 13, 2005

(86) PCT No.: PCT/US2005/045409
§ 371 (c)(1),
(2), (4) Date: Jun. 13, 2007

(87) PCT Pub. No.: WO2006/065988
PCT Pub. Date: Jun. 22, 2006

(65) Prior Publication Data
US 2008/0129137 A1 Jun. 5, 2008

Related U.S. Application Data

(60) Continuation-in-part of application No. 11/630,293, filed as application No. PCT/US2005/022011 on Jun. 21, 2005, which is a continuation-in-part of application No. 11/029,978, filed on Jan. 4, 2005, which is a division of application No. 10/132,936, filed on Apr. 26, 2002, which is a continuation-in-part of application No. 09/713,654, filed on Nov. 15, 2000.

(60) Provisional application No. 60/635,767, filed on Dec. 13, 2004, provisional application No. 60/737,587, filed on Nov. 16, 2005, provisional application No. 60/581,789, filed on Jun. 21, 2004, provisional application No. 60/286,862, filed on Apr. 26, 2001.

(51) Int. Cl.
*H02K 3/00* (2006.01)
(52) U.S. Cl. .................. 310/179; 310/216.001
(58) Field of Classification Search ........... 310/216.001, 310/216.051, 112–114, 179
See application file for complete search history.

(56) References Cited

U.S. PATENT DOCUMENTS

| 382,279 | A | | 5/1888 | Tesla | |
|---|---|---|---|---|---|
| 3,466,518 | A | * | 9/1969 | Veli et al. | 318/685 |
| 3,588,888 | A | * | 6/1971 | Harden | 340/319 |
| 3,808,481 | A | | 4/1974 | Rippel | |
| 3,821,619 | A | | 6/1974 | Hoffman | |
| 3,930,190 | A | | 12/1975 | Liska | |
| 3,931,553 | A | | 1/1976 | Stich et al. | |
| 4,138,629 | A | * | 2/1979 | Miller et al. | 318/140 |
| 4,292,575 | A | | 9/1981 | Kuhnlein et al. | |
| 4,484,115 | A | | 11/1984 | Takahashi | |
| 4,607,204 | A | | 8/1986 | Setoya | |
| 4,611,157 | A | | 9/1986 | Miller et al. | |
| 4,713,594 | A | | 12/1987 | Bose et al. | |
| 4,730,150 | A | | 3/1988 | Lee et al. | |

(Continued)

FOREIGN PATENT DOCUMENTS
DE 20/03639 A 8/1971
(Continued)

*Primary Examiner* — Dang Le

(57) ABSTRACT

The present invention is an electrical rotating apparatus comprising stator coils wound around the inside and outside of the stator. In a further embodiment, the machine contains a high number of phases, greater than three. In a further embodiment, the phases are connected in a mesh connection. In a further embodiment, each half-phase is independently driven to enable second harmonic drive for an impedance effect. Improvements are apparent in efficiency and packing density.

25 Claims, 9 Drawing Sheets

U.S. PATENT DOCUMENTS

| | | | |
|---|---|---|---|
| 4,736,147 A | 4/1988 | Shizang | |
| 4,751,448 A | 6/1988 | Auinger | |
| 4,755,732 A | 7/1988 | Ando | |
| 4,900,965 A | 2/1990 | Fisher | |
| 5,053,689 A | 10/1991 | Woodson et al. | |
| 5,068,587 A | 11/1991 | Nakamura et al. | |
| 5,075,610 A | 12/1991 | Harris | |
| 5,449,962 A | 9/1995 | Shichijyo et al. | |
| 5,488,280 A | 1/1996 | Langreck | |
| 5,614,799 A | 3/1997 | Anderson et al. | |
| 5,686,770 A | 11/1997 | Naito | |
| 5,703,457 A | 12/1997 | Davis | |
| 5,866,964 A * | 2/1999 | Li | 310/198 |
| 5,965,965 A * | 10/1999 | Umeda et al. | 310/52 |
| 5,977,679 A * | 11/1999 | Miller et al. | 310/164 |
| 6,028,385 A * | 2/2000 | Pengov et al. | 310/166 |
| 6,054,837 A | 4/2000 | Edelson | |
| 6,064,172 A | 5/2000 | Kuznetsov | |
| 6,101,109 A | 8/2000 | Duba et al. | |
| 6,153,953 A * | 11/2000 | Isozaki et al. | 310/216.112 |
| 6,175,272 B1 | 1/2001 | Takita | |
| 6,181,048 B1 * | 1/2001 | Smith et al. | 310/254.1 |
| 6,211,595 B1 * | 4/2001 | Nose | 310/216.111 |
| 6,373,160 B1 | 4/2002 | Schrodl | |
| 6,459,185 B1 * | 10/2002 | Ehrhart et al. | 310/156.45 |
| 6,657,334 B1 | 12/2003 | Edelson | |
| 6,727,632 B2 * | 4/2004 | Kusase | 310/266 |
| 6,768,279 B1 | 7/2004 | Skinner et al. | |
| 6,812,661 B2 | 11/2004 | Maslov | |
| 6,831,430 B2 | 12/2004 | Edelson | |
| 6,838,790 B2 * | 1/2005 | Arimitsu et al. | 310/43 |
| 6,838,791 B2 | 1/2005 | Edelson | |
| 6,892,439 B1 | 5/2005 | Neal et al. | |
| 6,922,037 B2 | 7/2005 | Edelson | |
| 7,116,019 B2 | 10/2006 | Edelson | |
| 2002/0041168 A1 | 4/2002 | Mann et al. | |

FOREIGN PATENT DOCUMENTS

| | | |
|---|---|---|
| WO | WO-00/51229 A | 8/2000 |
| WO | WO-2006/002207 A2 | 1/2006 |
| WO | WO-2006/065988 A2 | 6/2006 |

* cited by examiner

MOTOR WINDING

CROSS-REFERENCE TO RELATED APPLICATIONS

This application is the U.S. national stage application of International Application No. PCT/US2005/045409, filed Dec. 13, 2005, which international application was published on Jun. 22, 2006, as International Publication WO/2006/065988 in the English language. The International Application claims the benefit of U.S. Provisional Patent Application No. 60/635,767, filed Dec. 13, 2004, and U.S. Provisional Patent Application No. 60/737,587, filed Nov. 16, 2005. This application is also a continuation is part of U.S. patent application Ser. No. 11/630,293, filed Dec. 19, 2006, which is the U.S. national stage application of International Application No. PCT/US2005/022011, filed Jun. 21, 2005, which international application was published on Jan. 5, 2006, as International Publication WO2006/002207 in the English language. The International Application claims the benefit of Provisional Patent Application No. 60/581,789, filed Jun. 21, 2004 and is a Continuation-in-part of U.S. patent application Ser. No. 11/029,978, filed Jan. 4, 2005, which is a Divisional of U.S. patent application Ser. No. 10/132,936 filed Apr. 26, 2002, and which claims the benefit of U.S. Provisional App. No. 60/286,862 filed Apr. 26, 2001. U.S. patent application Ser. No. 10/132,936 is a Continuation-in-part of U.S. patent application Ser. No. 09/713,654, filed Nov. 15, 2000. The above-mentioned patent applications are assigned to the assignee of the present application and are herein incorporated in their entirety by reference.

TECHNICAL FIELD

This invention is related to electrical rotating apparatus.

BACKGROUND ART

Alternating current induction motors have been developed as suitable power driving sources. Polyphase motors, including three phase motors, are widely applied in industrial and similar heavy duty applications. A rotor is rotatably mounted within an annular stator. The stator is wound with N distinct phase windings, connected to an N phase alternating current power supply, where N is an integer. The rotor is normally provided with a short circuited winding which responds to the stator field to create an induced field. An N phase power supply has phase voltages and currents which are offset from each other by 360/N electrical degrees. The N phase winding thereby develops a magnetic field which moves circumferentially about the stator and rotor. The induced field tends to align with and follow the rotating field to create a rotating force and motion of the rotor as a result of the electromagnetic coupling between the fields of the stator and the rotor.

An alternating current motor is commonly driven by an inverter. An inverter is a device capable of supplying alternating current of variable voltage and variable frequency to the alternating current motor, allowing for control of machine synchronous speed and thus of machine speed. The inverter may also be used with alternating current generators, and can cause an alternating current motor to act as a generator for braking applications. An alternating current motor may be an induction motor, a synchronous motor with either a wound rotor or permanent magnet rotor, or a brushless DC motor.

In many cases, the cost of the inverter is considerably greater than the cost of the motor being supplied. It is thus necessary to minimize the size of the inverter power electronics in order to control system cost.

Whereas the alternating current machine itself may have substantial overload capability, and may carry currents of the order of five to ten times full rated current for periods measured in minutes, the overload capability of the inverter electronics is severely limited. Exceeding the voltage or current ratings of the inverter electronics will swiftly cause device failure. Commonly, inverter electronics is specified such that it can tolerate 150% of nominal full load current for 1 minute, and for any given motor, and inverter will be selected which has the same nominal current capability as that of the motor.

Voltage is set internally by the inverter system or by the rectified supply voltage. Voltage overload is normally not specified, and will cause near instantaneous destruction of semiconductor elements. The voltage ratings of the semiconductors instead set the maximum output voltage of the inverter system, and an inverter will be selected which has a maximum output voltage that matches the operating voltage of the motor at full speed.

With any reasonably sized inverter, substantial motor overload capabilities remain untapped.

Electrical rotating machinery presents an impedance characteristic that varies according to mechanical load and rotational velocity. As the speed of the electrical rotating machine is increased, the voltage produced by a generator, or the voltage required by a motor will tend to increase proportionally. For example, in an induction motor, in order to maintain a constant magnetic field strength as the applied frequency is changed, a constant ratio of applied voltage to frequency is maintained. For permanent magnet machines, the back-EMF produced by the motor will increase as rotor speed increases, again requiring increased voltage in order to drive the machine. U.S. Pat. No. 6,812,661 to Maslov discloses changing motor topology on a dynamic basis to obtain maximum efficiency for each of a plurality of operating speed ranges. A plurality of mutually exclusive speed ranges between startup and a maximum speed at which a motor can be expected to operate are identified and a different number of the motor stator winding coils that are to be energized are designated for each speed range. The number of energized coils is changed dynamically when the speed crosses a threshold between adjacent speed ranges. Even direct current machines (not covered by the present invention) require increased voltage as speed is increased, if magnetic field strength is maintained as a constant.

In general, the required voltage is expressed in terms of Volts/Hertz.

For traction application, there is often only limited available electrical power. Thus requirements for high overload capability can only be met at low speed, where high torque is required for starting, but reduced speed means that mechanical power output is still low. Such low speed torque requirements require high current to flow though the motor, but do not require high operating voltage. It is thus possible to trade high speed operating capability for low speed overload capability at the design stage of a motor drive system.

By increasing the number of series turns in the motor windings, higher slot current may be achieved with the same terminal current, thus permitting the same inverter to provide greater overload current to the motor. This increase in overload capability comes at a substantial cost. The increased number of series turns means that the motor operating voltage is increased, operation at high speed is prevented. Most motors are designed for dual voltage operation, through the expedient of operating various sub-circuits of the motor in series or parallel connection. The change between series and parallel connection may be accomplished though suitable contactor arrangements, permitting the motor to be operated with a higher number of series turns at low speed, and a lower number of series turns at high speed. For a simple three phase alternating current machine system, such a system would require at least two single-pole three-phase contactors, and would only offer a factor of 1.7 increase in low speed overload capability. With three contactors, a factor of two change is possible.

The change in series turns may be considered a change in alternating current machine impedance, or current versus voltage relation. Normally, an alternating current machine will have a fixed relationship between synchronous speed and impedance, characterized by the Volts/Hertz ratio. For a given inverter and machine frame, a machine wound with a higher Volts/Hertz ratio will have a lower maximum speed, but higher peak low speed torque.

It is thus highly desirable to provide an alternating current machine drive system in which the alternating current machine presents a variable Volts/Hertz ratio to the inverter. For high speed operation, the Volts/Hertz ratio would be adjusted to a low value, in order to maintain a suitable alternating current machine operational voltage. For low speed operation, the Volts/Hertz ratio would be adjusted to a higher value, so as to permit high overload torque operation.

In this disclosure, many of the following abbreviations are used:
RD: rotational degrees on the stator
ED: electrical degrees
H: harmonic order
P: pitch factor
B: base pole count, i.e. number of magnetic poles developed by a machine driven by fundamental frequency, H=1.
Kc: chording factor
N: number of different driven electrical phases in a machine
F: phase angle of any given winding phase
Δ: phase angle difference of the inverter output phases driving the windings
L: spanning value of mesh connection
V: volts
Vw: Voltage across a winding
Vout: output to neutral voltage of the inverter
W: Winding phase number
S: Slot number
T: Turn count The term 'winding' herein refers to the group of all of the windings and/or coils and/or conductors of a single phase, unless otherwise specified. In a conventionally wound induction machine, the winding that constitutes each phase consists of a 'supply half' and a 'back half'. The current flow from the 'supply half' is in the direction as it is supplied by the power supply The phase angle of the back half of each phase is equal to the phase angle of the supply half, offset by 180 ED. The windings are wound of copper or other low resistance wire or other conductors.

The following equations are also used, and presume even winding distribution. The same principles apply, with slightly more complicated mathematics, even if the winding distribution is not even:

| | |
|---|---|
| F = 360*H*W/N | (i) |
| Vw = 2*sin((B*H*Δ)/4)*Vout | (ii) |
| P = (winding pitch in RD)*H*B/360 | (iii) |
| Kc = sin(90*P) | (iv) |

An inverter is a device capable of supplying alternating current of variable voltage and variable frequency to the alternating current machine, allowing for control of machine synchronous speed and thus of machine speed. The inverter may also be used with alternating current generators, and can cause an alternating current motor to act as a generator for braking applications. An alternating current motor may be an induction motor, a synchronous motor with either a wound rotor or permanent magnet rotor, or a brushless DC motor.

Background—Mesh Connected Machines

In my previous patents and applications, incorporated herein by reference, there have been disclosed details of high torque compact motors that may be used in conjunction with the present invention. In U.S. Pat. No. 6,922,037, the use of high phase order machines are described, in which induction machines are equipped with more than three different phases. These increase the useful available torque. In U.S. Pat. No. 6,838,791, the use of connecting a high phase order machine with a mesh connection is described. A benefit of this is that by varying between harmonic drive frequencies of a mesh connected machine, the impedance of the machine may be dramatically changed. In WO2006002207, the benefit of using a short pitch winding with a mesh connected high phase order machine is disclosed. A benefit of this is that even order harmonic drives maybe utilized.

A mesh connected windings machine is disclosed in my previous abovementioned patents and applications. The mesh connection may be defined as follows. Each of N windings is connected between two of N inverter outputs. A first terminal of each winding phase is connected in phase angle order to one of the N inverter outputs. A phase angle difference is produced by connecting the second terminal of each winding to a second inverter phase. Δ represents the phase angle difference between the inverter output phases across the two terminals of each winding. All of the windings in a machine have the same value of Δ. Δ is measured according to H=1 and is irrespective of the harmonic order of the drive waveform. A low Δ is produced by connecting the first terminal of a winding to a first inverter phase, and the second terminal of the winding to the next inverter phase. For example, in a 9 phase machine, Δ may be 40, 80, 120 and 160 ED.

A preferred embodiment of a mesh connected machine is a high phase order machine in which each phase terminal is separately connected to an inverter output. The windings of the induction machine are wound with the motor terminals connected in a mesh connection to produce a low impedance output. The inverter is capable of operating with a variable phase sequence that changes the effective impedance of the motor.

In a mesh connected machine, the voltage applied to a given winding, which is measured from one terminal of the winding to the other terminal of the winding, will in general be different from the phase to neutral voltage fed to the machine. The reason for this is that the supply will be from a machine of different connection, and thus the relevant voltage measurements will give different results. Specific identified phase-to-phase voltages will always be the same for two connected high phase order machines, however the voltage placed across a winding or switching element will likely be different.

The following equations relate the voltage placed across the windings of a mesh connected machine to the voltages applied to the machine terminals as measured between the terminal and neutral. These are the equations which relate the output voltages of a star connected supply to the winding voltages of a mesh connected motor, and can be inverted to relate a mesh connected supply to a star connected motor. The equations could be used twice to describe a mesh connected supply connected to a mesh connected motor.

$$V_K = V_{MAX} \text{Re}\{e^{ih(\omega t + \frac{2K}{m}\pi)}\} \quad (1)$$

Equation 1 describes the line to neutral voltage of the supply, where m is the number of phases in a balanced supply, K is the particular phase of interest, and may range from 0 to m−1, ω is the frequency of the alternating current in radians per unit time, t is time, h is the harmonic order being generated, and $V_{MAX}$ is the peak voltage of the output waveform. The equation is written using standard complex exponentiation form, in which the constant e is raised to a complex number. In this case, the exponent is a purely imaginary value, thus the result of the exponentiation has constant periodicity over time. Only the real portion of this periodic function is used.

The terms in the exponent include a function of time, which results in the periodic nature of the voltage with time, and a constant rotation term, which results in the phase difference between the various phases.

Rearranging Equation 1, clearly separating the constant and periodic terms, gives:

$$V_K = \text{Re}(V_{MAX} e^{ih\omega t} e^{i\frac{2hK}{m}\pi}) \quad (2)$$

It is clearly seen that each phase differs from the other phases only by the constant rotation term, and that the periodic term does not depend in any way upon the particular phase.

The voltage across the particular winding K as a function of the voltage applied to its two ends is given by Equation 3.

$$VW_K = V_K - V_{(K+L)\% m} \quad (3)$$

The voltages applied to winding K are simply that of phase K and phase K+L, where L is the spanning value for the particular mesh connection, which represents the number of inverter output phases between the first and second terminal of each single phase winding. The greater the spanning value, the greater the voltage placed upon a winding for a given inverter output voltage. Expanding Equation 3 using the terms in Equation 2 gives:

$$= \text{Re}(V_{MAX} e^{ih\omega t} e^{i\frac{2hK}{m}\pi}) - \text{Re}(V_{MAX} e^{ih\omega t} e^{i\frac{2h(K+L)}{m}\pi}) \quad (4)$$

Equation 4 may be rearranged as follows:

$$= \text{Re}(V_{MAX} e^{ih\omega t} (e^{i\frac{2hK}{m}\pi} - e^{i\frac{2h(K+L)}{m}\pi})) \quad (5)$$

$$= \text{Re}(V_{MAX} e^{ih\omega t} (e^{i\frac{2hK}{m}\pi} - e^{i\frac{2hK}{m}\pi} e^{i\frac{2hL}{m}\pi})) \quad (6)$$

$$= \text{Re}(V_{MAX}(1 - e^{i\frac{2hL}{m}\pi}) e^{ih\omega t} e^{i\frac{2hK}{m}\pi}) \quad (7)$$

Equation 7 is the desired result, separating the exponential term into constant and periodic portions of the various variables. Of particular interest is that the term $V_{MAX}$, the periodic term, and the constant rotation term all remain as in the original equation, but an additional term is added. This term depends upon the applied harmonic h, the spanning value L, the number of phases m, but is independent of the particular phase K and is also independent of frequency ω or time t.

Equation 7 shows that the voltage applied to a winding depends upon the voltage output of the supply, but it also depends upon the harmonic order h and the spanning value L. By changing the spanning value, as for example by connecting the machine using a different mesh connection, the voltage applied to the winding will change even if the voltage output of the supply remains constant.

These equations demonstrate that for a given machine, the Volts/Hz ratio of the machine may be changed by altering either the harmonic applied by the inverter to the mesh connection, or by altering the spanning value L of the mesh connection between the inverter and the rotating machine.

The advantage of changing the harmonic applied by the inverter to the mesh connection is that the change in Volts/Hz ratio may be obtained through a logical change of the output synthesized by the inverter. This means that the motor may have a fixed electrical connection to the inverter. This technique is disclosed in my U.S. Pat. No. 6,657,334.

Furthermore, if desired, the change in harmonic content may be obtained in a smooth fashion, successively passing through various admixtures of harmonic components. Thus there need be no sudden discontinuity in drive when switching between harmonic operating states. Disadvantages of this technique are that it requires a machine capable of operation with harmonic drive; e.g. a pole count changing alternating current machine, or a synchronous machine with variable pole count rotor, or a permanent magnet machine with a rotor which reacts both to the fundamental and the harmonic components of the drive waveform. An additional disadvantage with a pole count changing alternating current machine is that the basic efficiency of such a machine will go down as the pole area is reduced. However the elimination of mechanical contactors is a benefit.

The advantage of changing the spanning value L is that the same machine pole count is maintained. Thus methods that change the spanning value L are applicable to machines with fixed pole counts. This includes some wound rotor alternating current machines, as well as most synchronous machines, permanent magnet machines, and brushless DC machines. Furthermore, for alternating current machine operation, pole area is maintained, which increases machine efficiency. Finally, changing the spanning value L generally permits a greater number of possible Volts/Hz ratios to be obtained from the same machine. Disadvantages of changing the spanning value L are that a mechanical contactor arrangement must be used to physically change the electrical connectivity of the mesh connection, and that power to the motor must be interrupted in order to change the mesh connection.

In a rotating electrical machine, each phase winding set can be described by two terminals. There may be a larger number of terminals, but these are always grouped in series or parallel groups, and the entire set can be characterized by two terminals. In a star connected machine, one of these terminals is driven by the inverter or power supply, while the other terminal is connected to the machine neutral point. All current flows through one terminal, through the neutral point into other windings, and though the driven terminals of the other phases. In a mesh-connected machine, these two terminals are connected directly to two different supply points.

An example of how this may be done is shown in FIG. 1a, in which stator slots 4 are shown as straight lines running down the inside of the stator, and inverter output phases 2, are shown as circles, alongside which is marked phase angles of each of the inverter output phases. Electrical connections 3 between the winding terminals in stator slots 4 and inverter output phases 2 are represented by dashed lines. Two winding halves are displayed opposite one another, and are actually joined to one another, although this is not shown. The configuration describes a 9 phase machine connected with an L=4 connection, as shown in FIG. 1*d*.

In contrast to three phase systems, in which there are only three inverter output phases and six motor windings terminals, in a high phase count system with N phases, there are N inverter output phases and 2N motor windings terminals. There are thus a substantial number of choices for how an N phase system may be mesh connected. This set of choices is greatly reduced by rotational symmetry requirements, specifically each winding must be connected to two inverter output phases with the same electrical angle difference between them as for every other winding.

A simple graphical schematic of the permissible inverter to motor windings connections may thus be described for a polyphase motor having N phases. In the following embodiment, N is equal to 9, but it is to be understood that this limitation is made to better illustrate the invention; other values for N are also considered to be within the scope of the present invention. FIG. 1*b* shows 9 evenly spaced terminals 4 and a center terminal 6. Each of the terminals 4 represent one end of a motor winding 1 and the center terminal 6 represents the other end of the motor winding. An inverter 5 has 9 inverter output phases 2, which are connected to one of the terminals 4 of each of the motor windings 1 via electrical connectors 3 as shown.

Permissible connections of the 9 phase windings are either from the center point, to each of the 9 points on the circle (this being the star connection shown as FIG. 1*a*) or from each of the 9 points to another point. This latter is shown in FIG. 1*d*; in FIG. 1*c* motor winding 1 is represented by a line, and in FIG. 1*d* inverter 5 and electrical connectors 3 have been omitted for the sake of clarity. It will be noted that for each L from 1 to 4 there is a corresponding L from 5 to 8 that produces a mirror image connection.

FIG. 1*d* shows all permissible connections for a 9 phase system from L=1 to L=4 as well as the star connection. Noted on the star connection diagram are the relative phase angles of the inverter phases driving each terminal. For a given inverter output voltage, measured between an output terminal and the neutral point, each of these possible connections will place a different voltage on the connected windings. For the star connection, the voltage across the connected windings is exactly equal to the inverter output voltage. However, for each of the other connections, the voltage across a winding is given by the vector difference in voltage of the two inverter output phases to which the winding is connected. When this phase difference is large, then the voltage across the winding will be large, and when this phase difference is small, then the voltage across the winding will be small. It should be noted that the inverter output voltage stays exactly the same in all these cases, just that the voltage difference across a given winding will change with different connection spans. The equation for the voltage across a winding is given by:

$$2\sin\left(\frac{\Delta}{2}\right)V_{out}$$

where $\Delta$ is the phase angle difference of the inverter output phases driving the winding, and $V_{out}$ is the output to neutral voltage of the inverter.

Thus, referring to FIG. 1*c*, when L=1, the phase angle difference is 40 degrees, and the voltage across a winding is 0.684 Vout. When L=2, the phase angle difference is 80 degrees, and the voltage across the winding is 1.29 Vout. When L=3, the phase angle difference is 120 degrees, and the voltage across the winding is 1.73 Vout. Finally, when L=4, the phase angle difference is 160 degrees, and the voltage across the winding is 1.97 Vout. For the same inverter output voltage, different connections place different voltage across the windings, and will cause different currents to flow in the windings. The different mesh connections cause the motor to present different impedance to the inverter. In other words, the different mesh connections allow the motor to use the power supplied by the inverter in different rations of voltage and current, some ratios being beneficial to maximize the torque output (at the expense of available speed), and some ratios to maximize the speed output (at the expense of maximum available torque).

As shown in FIG. 1*c*, the inverter outputs may be represented as points on a unit circle, with the relative positions of the points representing the phase angle of this inverter output. The winding of the motor is composed of individual single phase windings, each of which as two terminals. The single phase windings are represented by line segments, and are the single phase sub-elements described above. The end points of these line segments represent the terminals of the windings. When one terminal of each winding is connected to the origin, and the other terminal is connected to an inverter output as represented by a point on the unit circle, then a star connection may be represented. When line segments are connected between points on the unit circle, then a mesh connection is represented. An M phase symmetrical mesh connection will be represented by a diagram which has M fold rotational symmetry.

Each of the mesh connections may be represented by the spanning value 'L', which represents the number of inverter output phases between the first and second terminal of each single phase winding. The greater the spanning value, the greater the voltage placed upon a winding for a given inverter output voltage. Changes in spanning value may be considered a rotation of the connection between second terminals of each single phase winding and the inverter output phases.

In the foregoing and my previous patents, U.S. Pat. Nos. 6,657,334, 6,831,430, and 6,838,791, I disclosed details of high phase order induction machines. I focused particularly upon concentrated, full pitch windings, and the use of odd order harmonics. A benefit of these machines is that odd order harmonics with a harmonic number up to the phase count are marshaled to produce only beneficial torque. For the purpose of this disclosure as well as my previous disclosures, the term 'harmonic' was used to identify power supply phase angle relationships which were associated with the phase angles of harmonics in a fundamental drive frequency. The 'pure' harmonic is used as a new drive waveform, and results in a change in the number of magnetic poles developed by the motor. Harmonic drive may also be described as a multiplicative change in the power supply phase angles used to drive each winding. In this description, 'H' refers to the order of the harmonic drive. For example, H=1 refers to first harmonic drive, or fundamental drive waveform. H=2 refers to second harmonic drive, H=3 is third harmonic drive, etc. H=1 is not limited to any particular frequency, such as 50 Hz, and may instead be variable. However, in order to preserve clarity in the present disclosure, H=1 is mentioned as if it were a fixed frequency.

A machine is wound to give a base number of poles, B, which is the number of poles that are developed with fundamental harmonic drive (H=1). When a harmonic drive is used, the number of poles developed is equal to B*H, for example, if B=2, H=1 develops 2 poles, H=3 develops 6 poles, etc.

Full pitch windings (180 RD between supply and back windings) make most efficient use of the conductors in the slots. Concentrated windings permit maximum harmonics tolerance. With a lap winding, even order values of H are not useable with full pitch windings because of symmetry requirements. If even order values of H are applied to a full pitch winding, a 'magnetic short circuit' results, in which current flowing through the back half of the winding is in near opposition to the current in the supply half of the winding. The counter-flow currents cancel each other out, no magnetic field is produced, and machine inductance drops.

The lower the pole count, the more efficiently the machine operates. However, for various reasons, higher order pole count operation is often used, for example, for high torque applications. Nevertheless increasing the pole count unnecessarily, results in inefficiency. As mentioned, the drive harmonic impedance effect enables large changes in impedance simply by switching between two different drive harmonics, each associated with a different impedance characteristic. However, since the impedance effect depends on switching between two harmonics, the pole count may become unnecessarily high if only odd order drive harmonics are usable. In WO2006002207, I described a machine that can also be driven with even order harmonics. As may be seen from equation (iii), the pitch factor for the windings depends on both the harmonic order, and the winding pitch of the windings, measured in rotational degrees on the stator. Thus a winding pitch may be selected for the windings to result in a pitch factor that is not zero for each required harmonic drive. Full pitch windings, in which each winding spans 180 RD, produce a pitch factor of zero for all even order harmonics. Shorter or longer pitch windings are able to tolerate even order harmonic drive.

An example of a short pitch winding is shown in FIG. 2. Referring now to FIG. 2, a winding schematic is provided of a 36 slot, 36 phase machine with a short pitch winding. The design not limited to any particular number of slots or phases, and the example is given for exemplary purposes only. Stator slots are numbered 1-36. The lines adjacent the slots each represent the winding in that slot. The 36 windings are numbered W0-W35, only a few of which are marked, for clarity. Each winding is a different driven phase. The bend in each winding on the diagram represents the stator end turn and renders each winding as two halves, a supply half and a back half. The back half always has a phase angle difference of 180 ED from the supply half. Each winding has a pitch of 1:13, which represents a short pitch winding and the base number of poles, B, is 2. The slots containing the supply half and the back half of each phase are 120 RD apart from one another on the stator. The windings are concentrated, meaning that each half winding is not distributed over more than one slot. An N phase power supply supplies N voltages and currents to provide each winding with an electrical phase.

In the present example, each slot contains two winding halves. For example, winding W0 goes through slot 1 and returns via an end turn in the reverse direction through slot 13. Similarly, winding W2 goes in one direction through slot 2 and in the reverse direction through slot 14. In slot 13 is one half of winding W12, the other half of which is located in slot 25. According to equation (i) for H=1: W0 in slot 1 is driven with 0 ED, the other half of W0, in slot 13, is driven with 180 ED, and W12 in slot 13 is driven with 120 ED.

This shows that the two winding halves in any slot are 60 ED out of phase from one another. They are enough in phase to produce a reasonably combined slot current at 150 ED. However, since the different winding halves occupying each slot are somewhat out of phase, the effective slot current is something less than the sum of the two half currents, resulting in higher voltage and lower current. The efficiency of magnetic field production is reduced, but remains acceptable. The degree to which the voltage/current ratio is increased is measured by the aforementioned chording factor, Kc, applied to the turn count of the winding. The Kc of a high phase order machine with variable harmonic drive may be determined according to equation (iv).

When a winding is full pitch, the Kc for all odd order harmonics is 1, and the Kc for all even order harmonics is 0. A harmonic order that produces a Kc of zero is unable to drive the machine. Therefore, only odd order harmonics can drive a full pitch wound machine. However, in any short pitch winding machine, each harmonic order may produce a different Kc, dependent on the actual winding pitch.

In the machine of FIG. 2, the pitch is 0.67 for H=1, 1.33 for H=2, 2 for H=3, 2.67 for H=4, and 3.33 for H=5. H=1, H=2, H=4 and H=5 all produce a Kc of 0.87, and are therefore able to drive the machine. However, in the same machine, H=3 has a Kc of 0, so is prohibited.

In a mesh connected machine, Vw depends on the values of Δ and H. The V/Hertz ratio of the machine is dependent on Vw. It is also well known that the speed/torque output of the machine is dependent on the turn count, T, multiplied by the Kc. A novel feature of the present design is that not only are even order harmonics allowed, but the short pitch high phase order machine also presents a variable Kc, dependent upon both the pitch factor P, and the harmonic order.

The lower the Kc is, the higher the machine speed/torque ratio. In a mesh connected machine, it is possible to identify different operating regimes, such as high torque operation, or high speed operation. Each regime may be assigned a different harmonic order, identified to produce a V/Hertz ratio most suited to the regime. Table 1 gives recommendations as to the speed/torque relation associated with different values of H, Δ and Kc. In addition, as mentioned above, certain values of Δ give the greatest range in Vw under operation with different harmonics.

For example, when Δ is close to 120 ED, a large range in V/Hertz is produced between H=1 and H=3, in which H=1 produces a low V/Hertz ratio, while H=3 produces a high V/Hertz ratio. Therefore, H=3 is suited to low speed, high torque operation, since it allows the maximum torque to be produced. H=1 would be suited to high speed operation since it allows maximum speed to be produced. Since H may be varied electronically, a variable percentage of each harmonic may be applied at once, superimposed upon one another. The operating regimes may have a great deal of overlap, and a V/Hertz ratio may be optimized for an application's need in real time.

The Kc is also dependent on H, and the winding pitch must be chosen at the design stage to have desirable characteristics with regard to the regimes in which each harmonic is likely to be used.

If an application requires that a very high torque be produced at low speeds, and yet high speeds should not be compromised, a solution is as follows: At least two harmonics are identified, one to produce a low V/Hertz ratio and one to produce a high V/Hertz ratio. A winding pitch should be chosen that has a low Kc for the harmonic with a low V/Hertz ratio. This ensures that the top speed of the high speed operating regime will not be compromised. At the same time, the winding pitch should have a high Kc for the harmonic that produces a high V/Hertz ratio. The high Kc enables a low speed/torque ratio—and thus an effective torque boost—in the low speed, high torque operating regime. In the above example (in which B=2, and F is close to 120 ED, and H=1 is suited for high speed operation, and H=3 is suited for high torque operation), a very short pitch winding such as 60 RD will provide H=1 with a Kc of 0.5 and H=3 with a Kc of 1. The high speed/torque relation of H=1 is maintained, and the low speed/torque relation of H=3 is further decreased. If the identified harmonics were H=1 and H=2, the pitch would be chosen to be close but not equal to 90 RD.

However, other applications may have other requirements, and therefore each harmonic order should be matched with a Kc that meets the requirements of the application. For example, another application may require high torque at all speeds even at the expense of reaching top speeds. Therefore, a high Kc should be provided for each of the harmonic orders to be used.

Background—Motor Topographies

Common motors nowadays are cylindrically shaped. However, pancake motors are sometimes also used.

U.S. Pat. No. 6,892,439 to Neal, et al, is directed to a motor including a stator having multiple conductors that create a plurality of magnetic fields when electrical current is conducted through the conductors. The stator has a pair of opposing end surfaces in contact with each other forming a toroidal core. A monolithic body of phase change material substantially encapsulates the conductors and holds the toroidal core in place. The stator is formed by laminating strips together to form a linear core preform, winding wire around poles extending from a side of the core preform, then rolling the preform to bring its two ends together to form the toroidal core. Hard disc drives using the motor, and methods of constructing the motor and hard disc drives are also disclosed.

Some of the earliest motors were toroidal wound, including some of Tesla's work. For example, U.S. Pat. No. 382,279 to Tesla is directed to a toroidal motor.

DISCLOSURE OF INVENTION

Briefly, the present invention is an electrical rotating apparatus comprising stator coils wound around the inside and outside of the stator.

Technical advantages of the present invention include: elimination of cross-stator end turns, leading to a reduction in the total length of the winding conductor; layering of the conductors in an ordered fashion; utilization of a lower voltage between each turn, giving better insulation life; deployment of a thin insulator between each layer, almost creating a 'formed coil'; and permitting the use of square wire inserted into the slot, giving very good conductor fill.

A further technical advantage of the present invention is that it is particularly useful in conjunction with more than three phases. In particular, when the machine is wound with a low base pole count, eg B=2, higher order harmonic drive waveforms may be used instead of a high base pole count, to produce a high pole count. The toroidal design eliminates the end turn copper associated with bulky end turns for large machines having low base pole count designs.

In a further embodiment, the machine may be used with a dual rotor combination, so that both the inside and outside of the stator may be active.

Even order drive harmonics may be used, if the pitch factor for the windings permits them.

In a further embodiment, an AC electrical rotating apparatus is composed of: a rotor, a substantially cylindrically shaped stator that has one surface that faces the rotor, and a number of conductive coils. Each coil is disposed in a loop wound toroidally around the stator. A drive means, for example an inverter, provides more than three different drive phases to the coils. In a further embodiment, the machine is equipped with teeth or slots for lending firm support to said coils. The slots may be on the stator surface that faces the rotor or also on the opposite stator surface. In a preferred embodiment, each of the coils is driven by a unique, dedicated drive phase. However, if a number of coils have the same phase angle as one another, and are positioned on the stator in different poles, these may alternatively be connected together to be driven by the same drive phase. In a further alternative, where two coils or more have a 180 electrical degree phase angle difference between them, they may be connected in anti-parallel to the same drive phase.

The AC machine coils may be connected and driven in a number of ways, including but not restricted to: a star connection and a mesh connection. It is preferable that the drive means, for example, the inverter, be capable of operating with variable harmonic drive, so that it may produce the impedance effect. In one embodiment, the coils are connected with a short pitch windings. In a preferred embodiment, the coils are connected to be able to operate with 2 poles, or four poles, under H=1. The coils may be connected together in series, parallel, or anti-parallel.

In a preferred embodiment, the stator has a shorter stator slot length than stator diameter. The rotor may be internal to or external to the stator, and the machine may have a radial or axial flux configuration. In a further embodiment, the rotor has at least two active sections, for example, one facing the stator interior and one facing the stator exterior. This increases the active surface area of the stator. The two active rotor sections can be supplemented by a third active area at one stator end. Alternatively, the two active sections may be joined by a non active join at one stator end, to ensure that they rotate in synchrony. Alternatively, the two active rotor sections may be situated one at the end of the stator and one interior or exterior to the stator, so that they are normal to one another. Alternatively, the two active rotor components may be able to rotate independently, perhaps providing force in two simultaneous directions, and with different characteristics, depending on the rotor structure. In a further embodiment, there are multiple stators and rotors, interleaved together.

The machine may be a motor or generator, preferably having a high number of phases, and able to react to different harmonic drives, for example, an induction machine. In a further embodiment, each coil is wound with a high degree of precision. Layers of insulation may be added between turns of the coils, during winding.

In a further embodiment, the stator is manufactured first as an incomplete cylinder including a gap, and coils are slotted onto it. Then the gap is removed, by bending the stator or adding a section. The coils are distributed evenly or with a required distribution. Teeth also may be added then.

In a preferred embodiment an AC machine is provided with a number of toroidal wound coils each representing one phase. The coils are connected mesh, in which the span of the mesh associates a specific impedance profile with each of a selection of harmonic drive orders. The coils are each driven with an independent drive phase. The order of the harmonic drive is varied in order to select between the impedance profiles.

BRIEF DESCRIPTION OF DRAWINGS

For a more complete explanation of the present invention and the technical advantages thereof, reference is now made to the following description and the accompanying drawings, in which.

BEST MODE FOR CARRYING OUT THE INVENTION

Embodiments of the present invention and its advantages are best understood by referring to FIGS. 3-4 of the drawings, like numerals being used for like and corresponding parts of the various drawings.

Figure 1A:
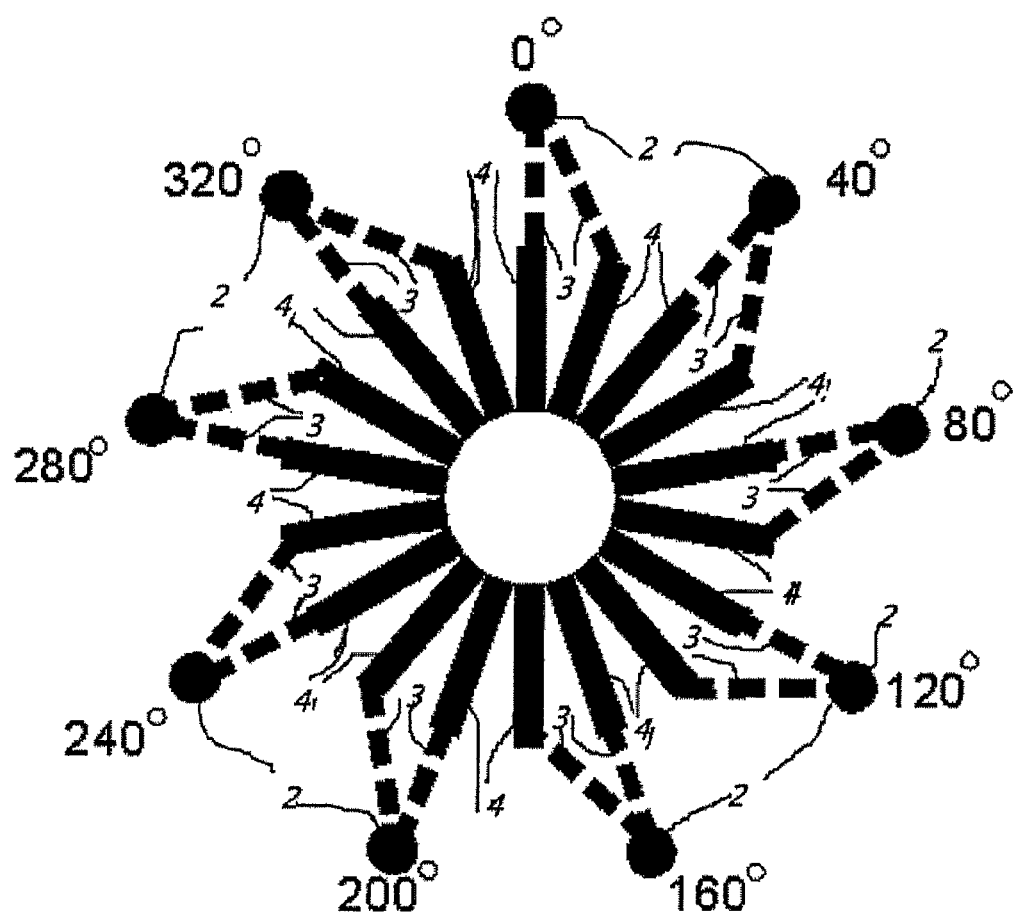
FIGS. 1a-1d show (prior art) high phase order mesh connections usable with the present invention.
Figure 1B:
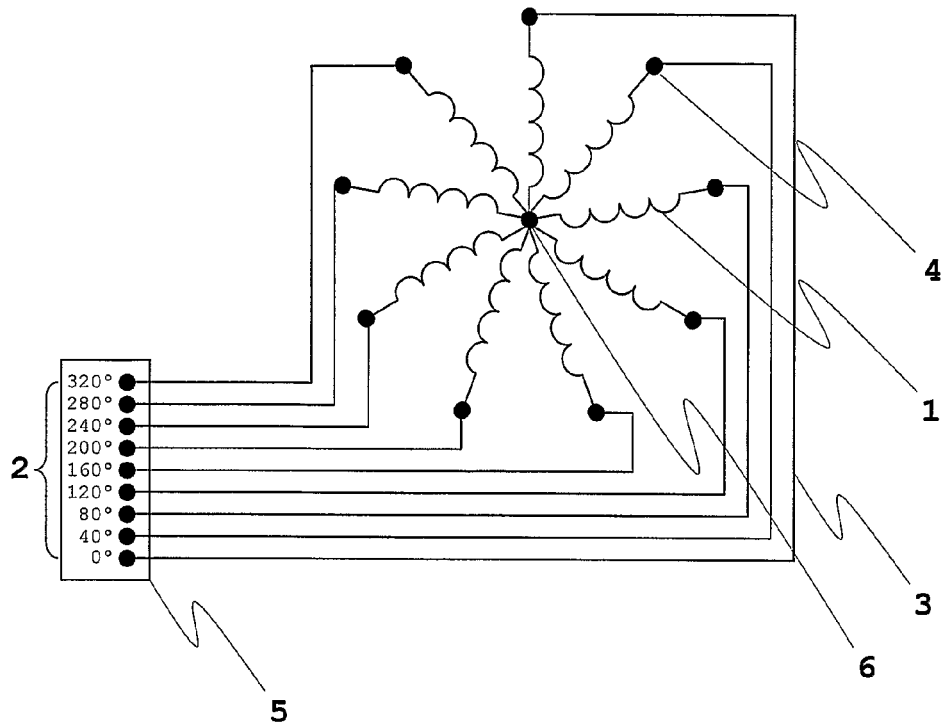
Figure 1C:
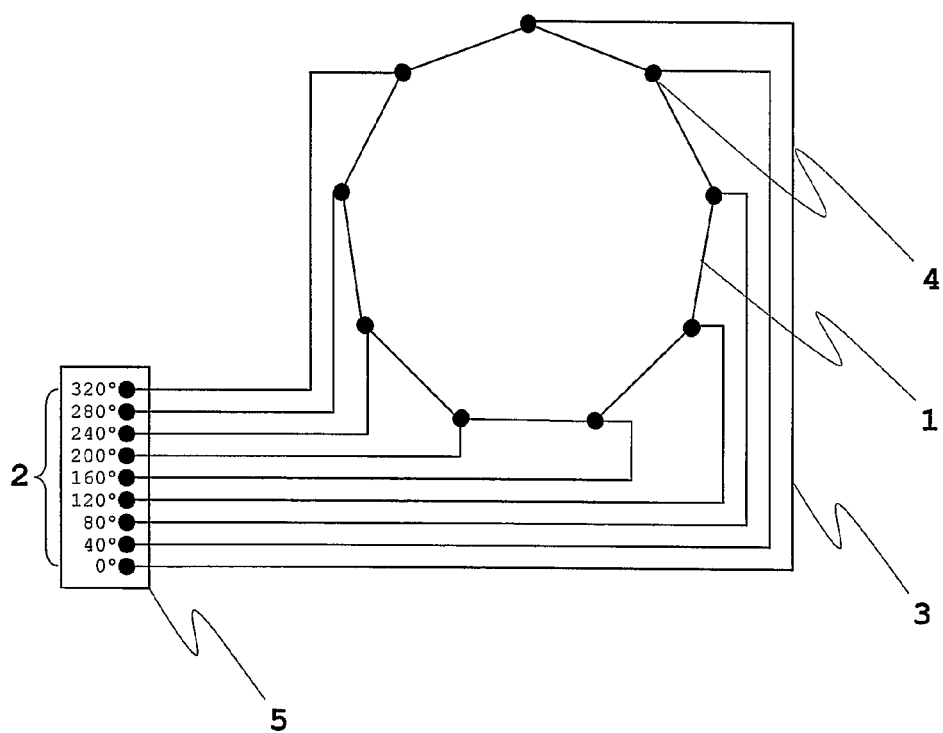
Figure 1D:
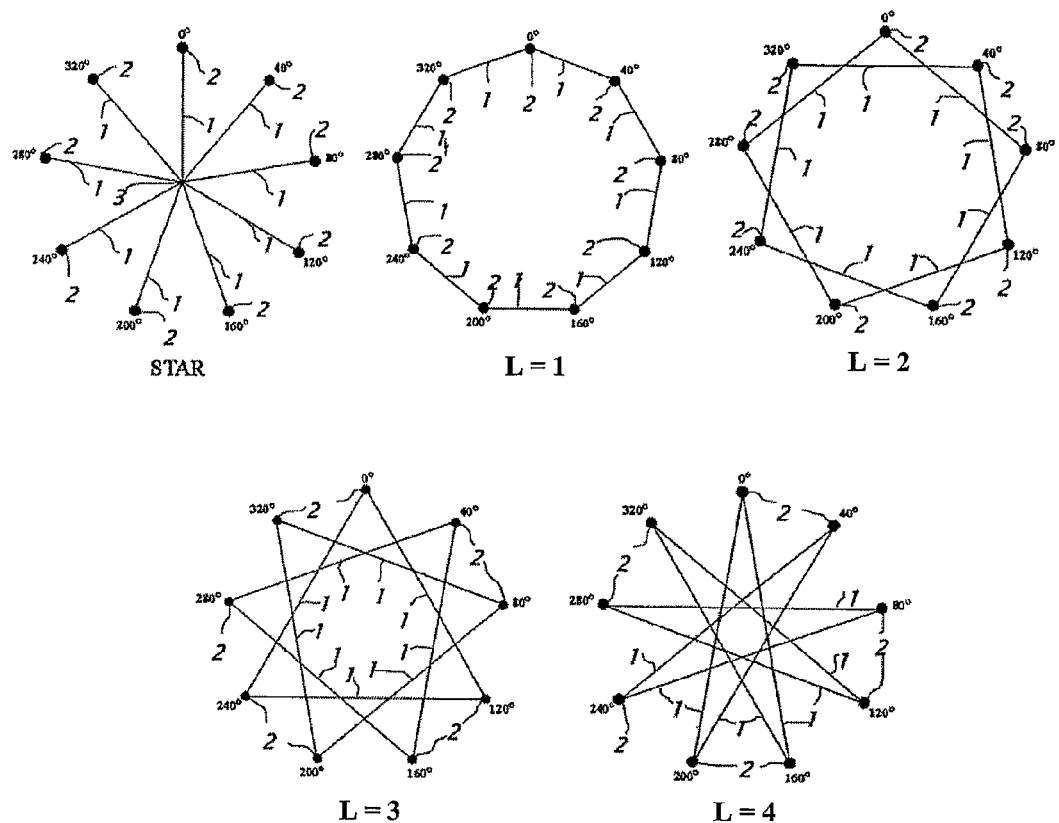
Figure 2:
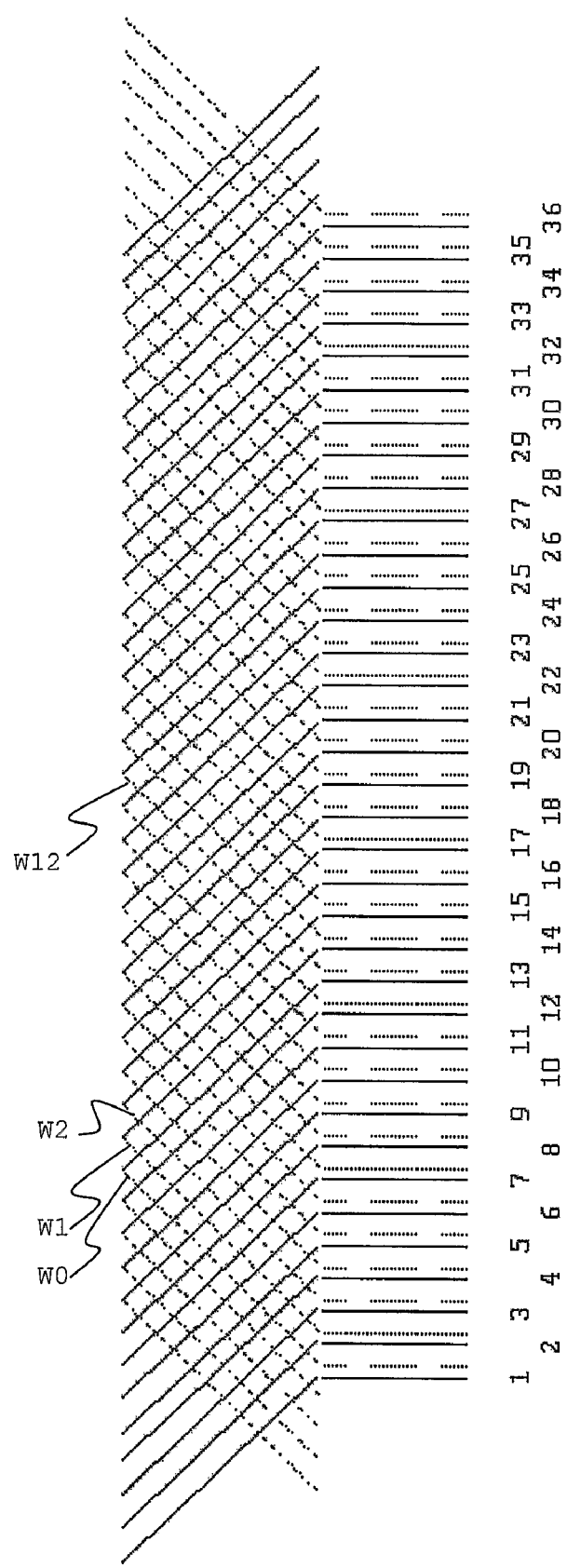
FIG. 2 shows a 36 phase two pole stator winding configuration (prior art) usable with the present invention.
Figure 3A:
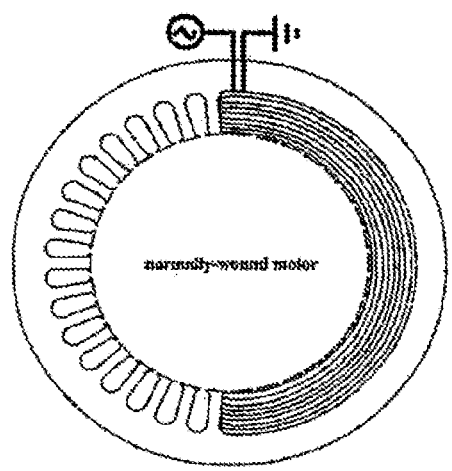
FIG. 3a shows a schematic of prior art stator end turns.

FIG. 3a shows an end view of one of the windings of a prior art, normally wound, 2 pole stator. The winding is composed of multiple conductor turns, placed in two slots on opposite sides of the stator. The conductor turns form a loop around the two sides on the stator via end turns as shown. As will be readily appreciated, these end turns comprise a more-or-less large proportion of the total conductor length used, depending on the relative length and diameter of the stator. This represents a full span winding. Short pitch winding are often used to reduce the problems with end turns, but they introduce their own costs.

Figure 3B:
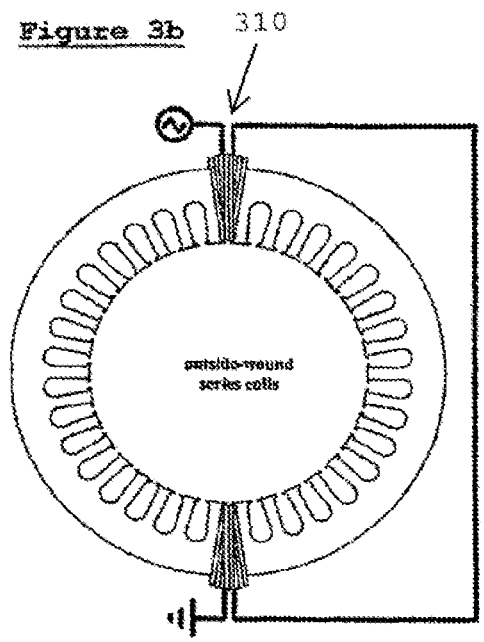
FIG. 3b shows a schematic of outside-wound series coils of the present invention.

FIG. 3b shows a schematic for the present invention. The invention is directed to an outside-wound stator, in which the conductor forms a loop, not via end turns as in the prior art, but via the outside of the stator. Assuming the stator is shaped like a hollow cylinder, each coil is wound down an internal wall of the cylinder, across the bottom cylinder wall, back up the corresponding outside wall of the cylinder, and across the top cylinder wall. The rotor is internal to the stator, and only the portion of the coil that is internal to the stator cylinder is active. A large number of coils are placed around the stator circumference. FIG. 3b is simplified to show only two coils. These are connected in series, in a two pole configuration, as is commonly employed.

Figure 3C:
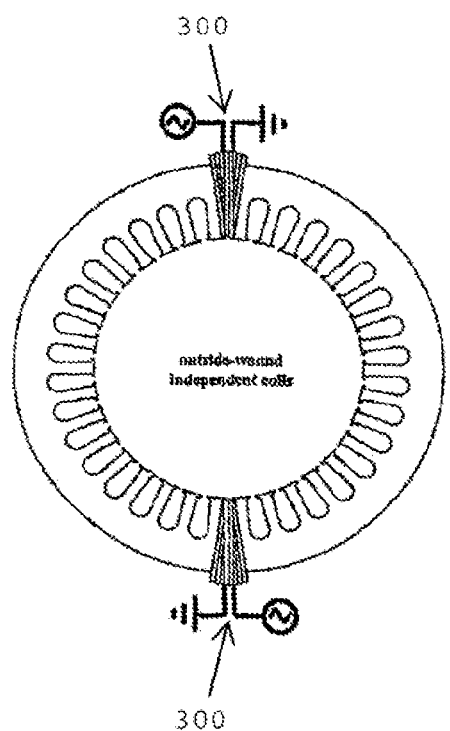
FIG. 3c shows a schematic of outside-wound independent coils of the present invention.

With reference now to FIG. 3c, a toroidal wrapped motor is shown, in which coils are each independently driven.

Figure 3D:
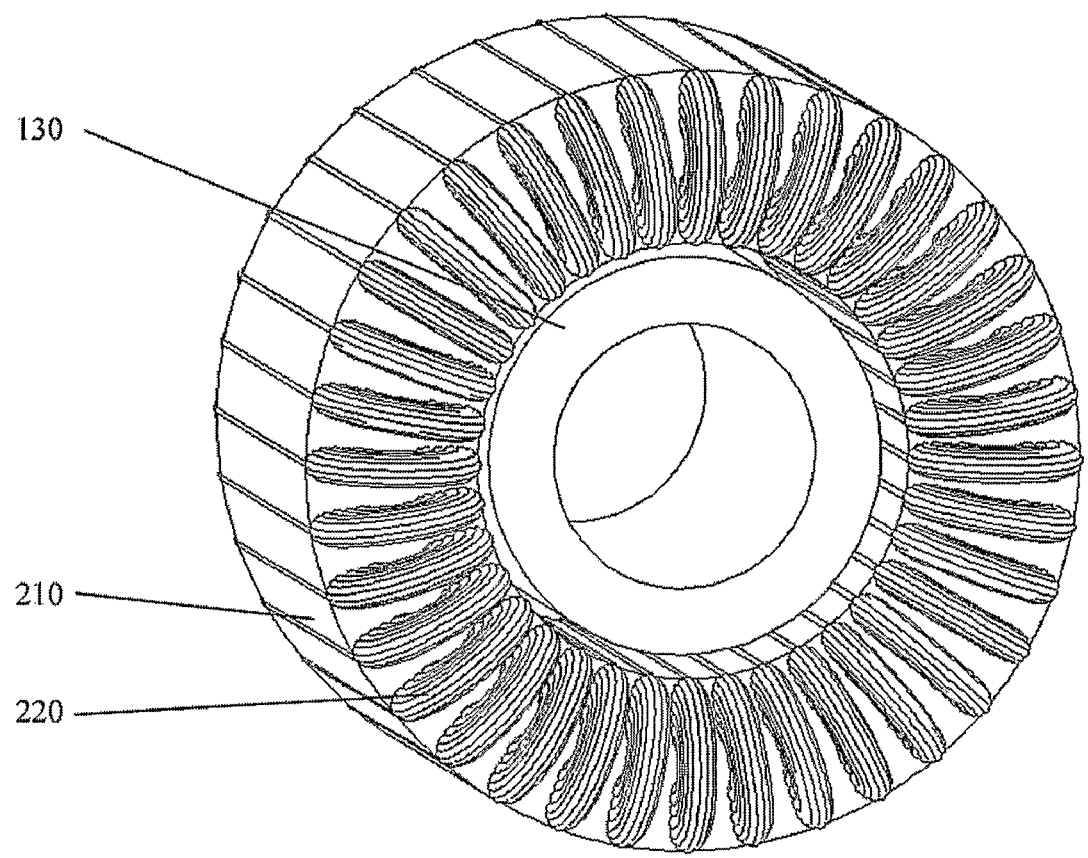
FIG. 3d represents a toroidal wound machine stator of the present invention.

With reference now to FIG. 3d, a fully wound view of stator 210 is provided. Stator 210 is equipped with slots on the inside and out. Rotor 130 is internal to stator 210. 36 coils 220 are individually wrapped around stator 210. Wrapping the coil around the outside of the stator in this fashion provides a design that is easier to wind, can have excellent phase separation, and allows independent control of the current in each slot. This eliminates many cross stator symmetry requirements.

Figure 3E:
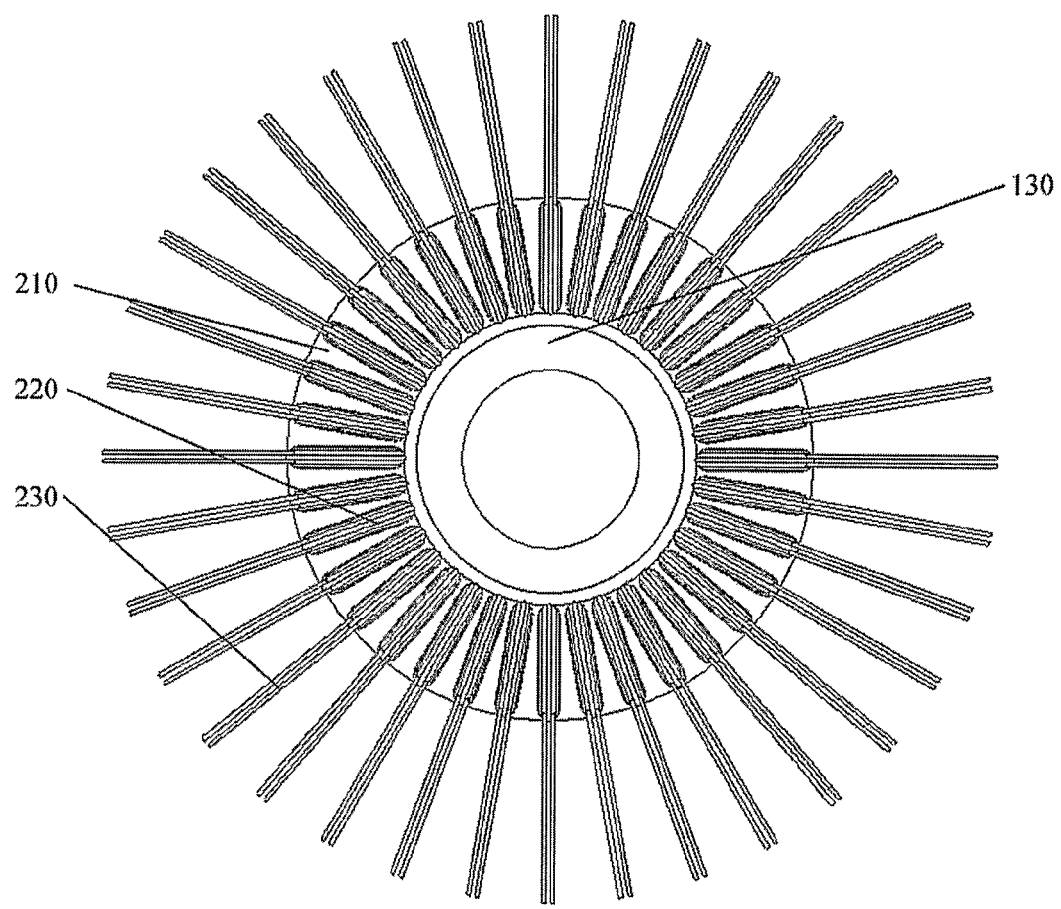
FIG. 3e represents a toroidal wound machine of the present invention showing phase terminals.

With reference now to FIG. 3e, a stator equivalent to FIG. 3d is shown, with two terminals 230 shown for each coil. Terminals 230 may be connected in series or parallel to other coils, and are driven by inverter outputs.

The value of the design depends on stator length and circumference, and winding configurations. These determine how much of the conductor coils are unused in active power production. In conventional stator designs, the unused conductor is generally in the 'end turn' length. For example, in a large, conventional two pole machine, in which the end turns must each cross the stator diameter, the amount of wire wasted as end turns is easily longer than the wires actively used in the slots. For example, a 2 pole machine having a slot length of 4.5 inches and a mean turn length on the order of 40 inches, has 75% of the wire in the 'end turn', and the end turn is very bulky, requiring a shorter lamination stack. In contrast, by using the winding of the present invention, the unused conductor will be shortened considerably. This is the case even though the 'back half' of each coil is not used, since in many designs the back side of the coils is considerably shorter than the 'end turns'.

However, in many cases, the toroidal winding of the present invention results in longer end turns than a conventional winding, and yet still remains beneficial. For example, in a conventionally wound, large 6 pole design, each coil goes down one side of the stator, cuts a rough chord suspended by approximately 60 RD across the stator end, and goes up the stator to produce an adjacent pole, and around the other stator end to form a coil. The end turn length in this case may be only approximately 80% of the slot length. Winding a 6 pole motor using the toroidal winding method of the present invention, around the outside of the stator, may tend to increase the length of the unused wiring. Nevertheless, the design still has the utility since it provides easier winding, which can lead to better slot fill and thus better performance even with increased unused conductor length.

It is significant to note that the relative change in unused conductor length is not caused only by the number of poles, but instead by the ratio of pole size to slot length. For example, with 'pancake' machines with short slot length, the toroidal winding will result in a shorter end turn even for machines of high pole count. In general, the following design features will be most advantageously suited to the toroidal winding of the present invention: low pole count, short slot length, long pole span (circumference), and large diameter. The particular configuration for any particular design will depend upon all of these factors.

The machine may be a motor or a generator, either of which can benefit from the present invention. For example, a generator will have different operating characteristics depending on the drive harmonic with which it is run. In addition, it may be more compact with the toroidal coils of the present invention.

When a conductor is wound in a stator, each turn of the conductor through a slot will have the same voltage. This is the same for lap windings and toroidal windings. However, in a toroidal winding, each turn consists of a conductor in only one slot, as opposed to a conventional winding, in which each turn consists of two slots. Therefore, for a toroidal winding, the voltage per turn is reduced by half.

Another benefit of the toroidal design is improved slot fill. Conventional machines are built using what are known as 'random wound' coils where coils of wire are inserted into the slots. Partly due to the cross-stator end turn requirement, this results in a random arrangement of adjacent conductors. In the present invention, the coils are formed around the stator structure. By carefully placing the wire in an ordered fashion, a pseudo 'formed coil' is produced. Voltage between adjacent turns is controlled and limited to much less than the peak coil voltage. The benefit of this is that the voltage between adjacent turns can be well controlled. In a further embodiment of the present invention, extra insulation may be added between layers of conductors.

With reference now to FIG. 3e, the terminals for each coil are seen as extended. These coil terminals may be connected to other terminals and inverter output drive phases, in one of a number of different coil connections.

a) As shown in FIG. 3c, each coil of each pole is treated as a different phase. Each coil is independently driven by a unique inverter output 300, or by a unique combination of two inverter outputs. Within the machine, it may-be that two coils are supplied with drive at a 180, or 360 electrical degree phase difference, and could in theory be driven by the same inverter output phase, in series, parallel, or anti-parallel, nevertheless, each coil is driven independently, by a unique inverter output or a unique combination of inverter outputs. These two options are termed collectively as a "unique drive phase". Even a coil representing a phase that reappears on the stator, as the same phase in a different pole, is independently driven.

b) Alternatively, for a two pole machine, each coil is connected to another coil of an opposite pole, and driven in anti-parallel. This is shown in FIG. 3b. Each coil is similar to a half of a winding phase, of a conventional winding. Thus in a two pole machine, for example, a coil positioned with an angle of 0 RD will be driven in anti-parallel to the coil positioned at an angle of 180 RD, by the same drive phase 310.

For a machine having a base pole count greater than two, two options exist:

c) Coils that are to be driven with the same phase angle, yet are positioned within different poles, are connected together and driven by the same drive phase. Thus in a four pole machine for example, a coil positioned at an angle of 0 RD may be connected to the coil positioned at an angle of 180 RD, and driven together. A coil positioned at an angle of 90 RD is connected to the coil positioned at an angle of 270 RD, and driven together by the same drive phase. The latter two phases are not driven in anti-parallel to the former two mentioned phases.

d) Coils that are to be driven with the same phase angle, yet are positioned within different poles are connected together, and are also connected inversely to coils that are to be driven by that phase angle plus 180 electrical degrees. All of these coils are driven by the same drive phase. Therefore, in a four pole machine, a coil positioned at 0 RD is connected to the coil positioned at 180 RD, and also is connected in anti-parallel to the coils positioned at 90 RD and at 270 RD.

e) More than one adjacent coil are connected together to form a phase, and are connected to other coils according to one of the options of a-d above.

f) The winding may represent a short pitch winding, in which two coils that are less than a full pole away from one another on the stator are connected together, and driven in anti-parallel. For example, if trying to simulate a short pitch winding for a two pole machine, coils that are positioned at 0 RD and 150 RD may be connected together. A toroidal winding with connected coils less than a full pole apart is termed in this disclosure as being a 'short pitch winding', and the winding pitch is measured as the rotational distance between two phases 180 ED apart on the stator. A problem with short pitch windings is that they may introduce a great degree of high order harmonic.

This can be surmounted by placing two coils in each slot effectively doubling the phase count. In this way, the phase angles of the two coils of each slot may blend together and produce a relatively smoothly rotating magnetic field on the stator. Therefore for this connection, it is recommended to have twice the number of coils to slots. The number of inverter output phases is equal to the number of slots, since the coils may be driven with anti-parallel drive, as in b or d above.

In the above variations in which identical phases within different poles are connected together, this may be done is series or parallel, depending on voltage and current requirements. If two coils are placed in the same slot, they may be driven separately or together. If they are both placed in the same slot and are connected together, they are treated in this disclosure as a single coil. The invention is not limited to any specific number of phases or poles. However, it is noteworthy that if the base pole count of the machine is low, and the number of independently driven phases is high, there are fewer symmetry constraints for the machine. One benefit of fewer symmetry constraints is the wide selection of drive harmonics that can be used in the machine. Drive harmonics are required for the impedance effect.

Connected coils forces additional symmetry into the machine, because interconnected coils must always be in rotationally symmetrical positions. So while one gains the benefit of fewer inverter outputs, one also restricts the allowable magnetic pole counts. For example, in a 36 slot machine, if the coil in slot 1 is connected in parallel connection to the one in slot 19, the current must always flow in the same direction in these two coils. This forces the system that whenever there is an N pole at the top of the stator, there is always also an N pole at the bottom of the stator. Thus the motor could be used with four or eight poles, but can never be used as a 2 or 6 pole motor. The more connections that are forced, the less pole count variability is available. It is an engineering tradeoff, between using more phases for greater flexibility, or fewer inverter output phases for cheaper cost. To produce a choice of H=5 and H=6, for example, one may require a lot of inverter outputs, to enable this. In some applications, this may represent an inordinate expense, while in large applications, it may be trivial. This tradeoff can be considered for each application based upon a cost-benefit analysis.

In a preferred embodiment, the machine has a high number of different phases. This includes any number of phases, ranging from four upwards, for example, seventeen different phases.

In a toroidal machine of the present invention, the number of phases need not be related to the number of poles. There could be 7 slots with seven coils, for example, and then the machine could be operated with 2, 4 or 6 poles (H=1, 2, 3). The only requirement is that the electrical spacing between the slots be less than 180 degrees.

Besides connecting coils together in series, parallel, or anti-parallel, it is also possible to reduce the number of inverter output phases required by using half bridges, instead of full bridges. The machine may be connected with a star or a mesh connection.

For a star connection, each coil is driven at one terminal by an inverter output, while the second terminal of each of the coils is connected together in a 'voltage pool'. Star connections are well known in the art. The star connection renders each coil independent, or, in the case of series/parallel connected windings, where one inverter phase drives several coils, the star connection renders each set of connected coils independent. Thus the star connection can enhance reliability—if a coils or set of connected coils fails, the rest of the machine is still fully operational. With coil connection a) above, one terminal of each coil is driven with a unique inverter output, while the other terminal is held in a voltage pool.

Alternatively, the machine may be mesh connected, as described in the background section above. For the independently driven coils of the present invention, each terminal of each coil is connected to two inverter output phases. Each inverter output phase is connected to two coils of different phase angle. The phase angle difference across the two terminals of each coil is equivalent to A mentioned above. Coils may be connected to one another according to any of the coil connections a)-f) above, and driven together. In the case of coil connection a), each coil is driven by a unique inverter output drive. This means that the two terminals of each coil are driven by a pair of inverter outputs that are not used in the same combination to drive any other coil.

The impedance effect is provided when the coil connections and phase count support the use of drive harmonics. The value of Δ provides different machine impedance for different drive harmonics. For some applications, it is desirable that the drive harmonic be as low as possible, for example, due to efficiency considerations. For other applications it is desirable that the drive harmonic be as close as possible to a certain value In larger machines, it is often desired to operate with a higher pole count, for example, approximately ten poles. The number of poles determines the drive frequency to rotor speed ratio. Short pitch windings enable even order harmonics to be used, as mentioned in the background section, and with respect to coil connection f) above. The winding pitch must be chosen to have a substantial pitch factor for the specific even order harmonics required. For example, to produce a choice of ten and twelve pole fields, a two pole structure may be used, with a choice between H=5 and H=6 as the drive harmonic. The winding pitch cannot be 72 RD, 120 RD nor 180 RD since these winding pitches produce a zero Kc for H=5 or H=6. However a mid-value, for example, a winding pitch of 150 RD may be used.

The use of short pitched windings usually necessitates that the number of different driven phases be doubled. In other words, in order to properly blend phases in the short pitch winding machine, the phase count should normally be equal to the slot count, unless the windings or slots are distributed. The current flow in each slot must be calculated, and the composite electrical angle should be smoothly related to actual slot position.

However, the shortened winding pitch is not the only way in which even order harmonic drives can be used. What is required for even order harmonic drives is to break the symmetry of a single coil connecting between equal positions on opposite sides of the stator. For example, in a 36 slot machine, slots 1 and 19 cannot be formed of connected coils, if H=2 is to be usable.

A different way to break the symmetry of a coil arises with the toroidal winding machine of the present invention. Using the coil connections of a) or c) above, the machine may be driven with second harmonic. Coil connection c) may limit the allowable harmonic drives, for example, it may prevent H=1 and H=3, whilst allowing H=2 and H=4. However, coil connection a) allows all values of H up to the phase count per pole.

In a further feature of the present invention, increased efficiency for the impedance effect is envisaged. As mentioned, a harmonic drive produces a rotating magnetic field having a pole count equal to B*H. It makes little difference to the magnetic fields developed whether a machine is wound with 10 poles and driven with H=1 or is wound with 2 poles and driven with H=5. In large machines with conventional windings, the only way to achieve high pole operation is by winding the machine with a high base pole count. In theory, the machine could be wound with a low pole count (low B) and operated with a higher order drive harmonic (high H), to achieve the same high pole count operation. However, low B-high H operation is not used in large machines since it is very difficult to wind a large machine with a low pole count, since the end turn length becomes prohibitively long. In a conventional machine with a high pole count, each winding is usually wrapped between two adjacent poles. This reduces the otherwise enormously long turn count. Therefore, a machine is conventionally wound initially with a base pole count selected to produce the required torque under operation of H=1. The result of this is that the base pole count is often quite high. When using a higher order drive harmonic to produce the impedance effect, the produced pole count is at least doubled or trebled. A doubled pole count is often unnecessarily high, and reduces the efficiency of the machine.

The benefit of a low base pole count is that varying the drive harmonic, to achieve the impedance effect, can produce a selection of operating pole counts that are similar to one another. For example, a ten pole machine may be wound with B=2, and select between H=5 and H=6 to vary the impedance. These produce either ten or twelve poles, each associated with a different impedance characteristic. This is far more efficient than a machine wound with B=10 and operated with a selection between H=1 and H=2, since H=2 would produce 20 poles, which is inefficient.

The toroidal design enables the machine to be wound with a low base pole count, even if the machine is very large. This is because either each coil is separately driven, or alternatively, only a single connector must connect between connected coils. Thus there are no bulky cross-stator end turns that force high base pole counts. This benefit is in addition to the benefit mentioned above, that a greater variation in harmonic drives is enabled, due to the lack of rotational symmetry constraints with independently driven coils.

Much specificity is provided in this disclosure. This is intended for exemplification purposes only, and should not be seen as limiting the invention in any way.

In one embodiment, the stator is shown as having teeth on the stator surface that faces the rotor. These teeth may hold the coils, and lend firm support thereto. However, slots are not always required. In another embodiment, teeth may be added after the coils are wound. In another embodiment, as for example, shown in FIG. 3b, the cylindrical stator exterior is shown as flat. However, in a further embodiment, as shown in FIG. 3d, real teeth or just support 'teeth' may be placed on the stator exterior, or any other of the stator's surfaces. Support teeth provide mechanical support to the stator and are particularly useful if the stator is to be pressed into a motor housing. The teeth need not be magnetically used, and may be just stubs of teeth to make mechanical contact. Teeth may be larger, wider, or smaller than shown. In a further high phase order embodiment, there are no stator teeth.

In a further embodiment, insulation may be added between coil turns due to the ease of winding a toroidal winding. The slot fill is improved, and may even approach 100%. In addition, the winding is simplified. The winding may almost resemble a formed coil. In a further embodiment, the stator is manufactured with a gap, for example, it is formed as a cylinder with a missing section. Formed windings are slotted on through the missing section, and the stator is then made continuous. For example, the stator cylinder is completed, either by heating and compressing, or by adding a section. The stator windings can then be redistributed, to evenly circle the stator. Teeth may be added afterwards.

The toroidal winding is possible for both radial and axial flux machines. In addition, the rotor may be internal to or external to the stator.

Figure 4A:
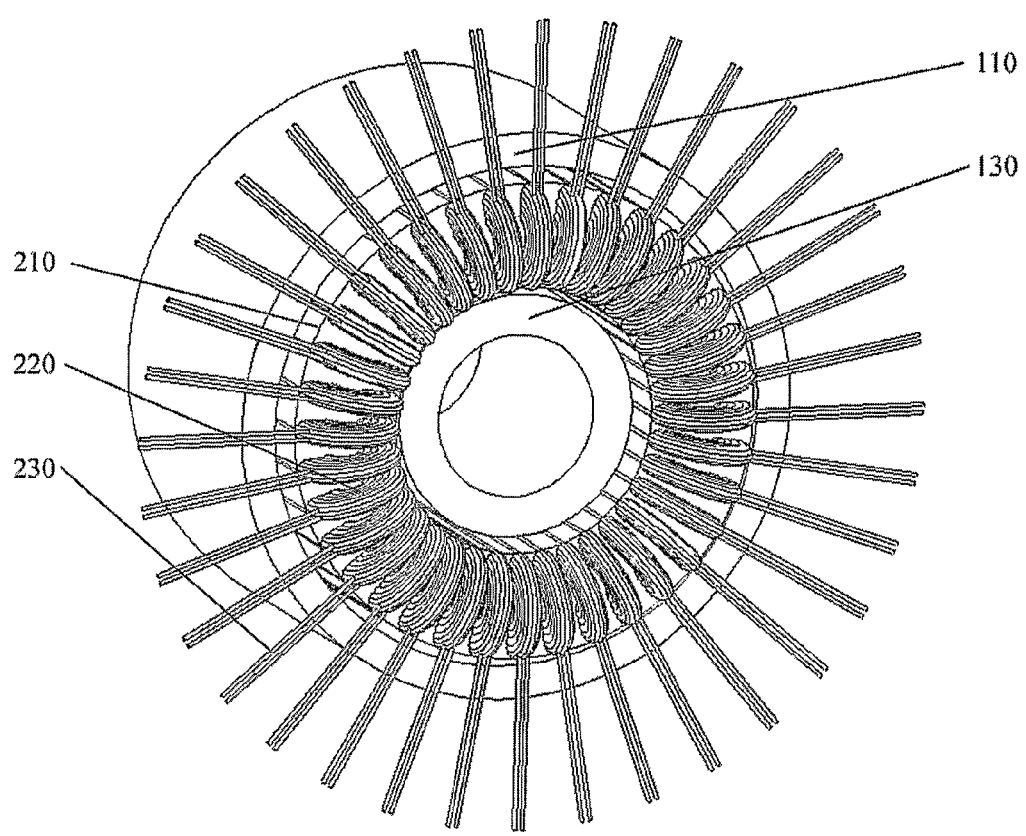
FIGS. 4a and 4b show a dual rotor configuration.

With reference now to FIG. 4a, in a further embodiment, a dual rotor is used. One rotor part is internal to and one external to the stator. Stator 210 has teeth on the inside and outside. Windings 220 are wound around stator 210. External rotor 110 is external to stator 210. Internal rotor 130 is internal to stator 210. The benefit of the dual rotor is that more of the stator winding conductors are involved in active power production.

Figure 4B:
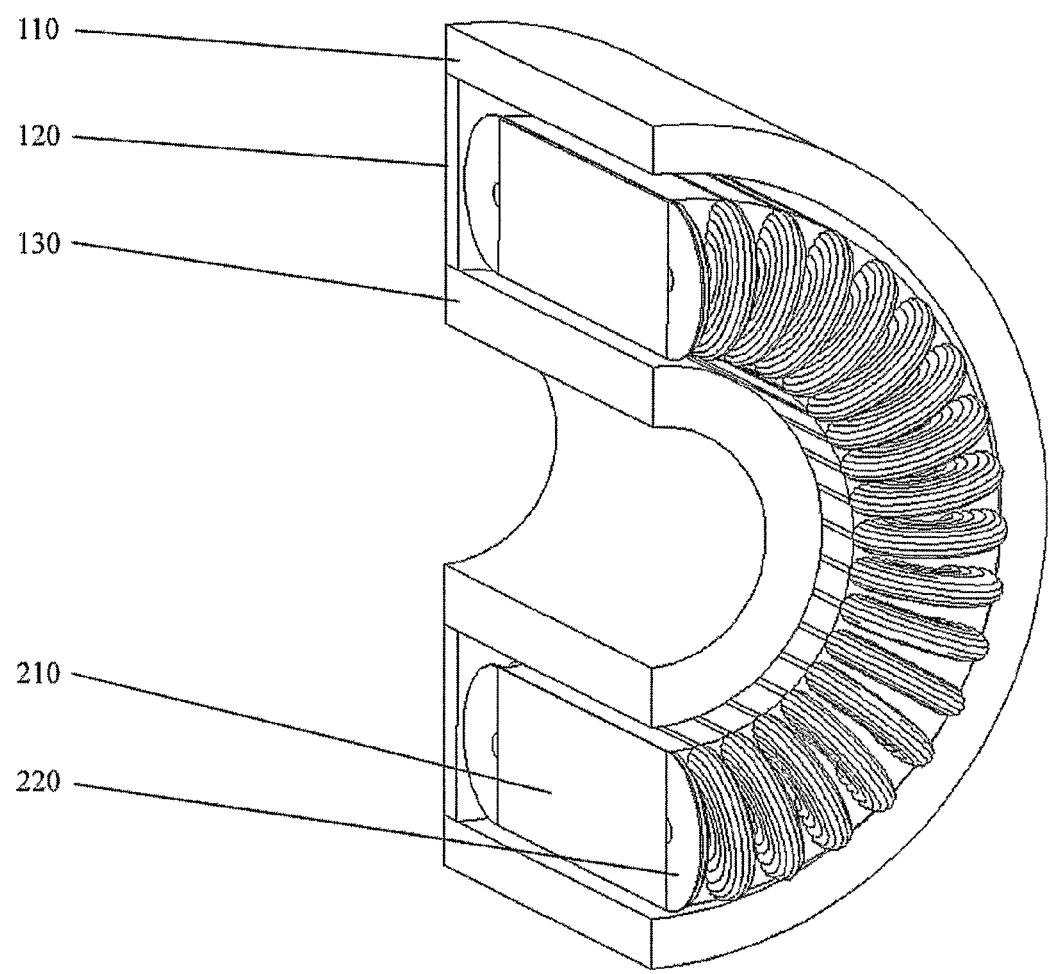

FIG. 4b shows a cutaway view of the same stator rotor combination as FIG. 4a. External rotor 110 is connected to internal rotor 130 through join 120. In a first embodiment, join 120 is completely non conductive, and serves only to unite the two rotors 110 and 130, enabling them to spin in synchrony, and together provide rotational energy to a load. In a second embodiment, join 120 is also able to conduct electricity as an axial flux rotor, providing a total of three rotors rotating in synchrony. In a third embodiment, multiple stator rotor combinations are interleaved together. For example with five components, the configuration leading from the center would be rotor-stator-rotor-stator-rotor. In a fourth embodiment, join 120 is not used, and the two rotors are able to spin independently. The two active sections may have different characteristics from one another in response to the stator magnetic field of said stator, and each rotor may rotate independently from the other with a different orientation or speed. In a sixth embodiment, the dual rotor combination consists of one rotor normal to the other. These may be connected together to rotate in synchrony. In general, the design of the present invention may be used with any induction machine geometry, in which a stator's rotating magnetic field is intercepted by a set of shorted or variable resistance conductors.

The invention claimed is:

1. An AC electrical rotating machine having a high number of phases, a low base pole count, and the ability to react to a variety of different harmonic drives comprising:
   a. a substantially cylindrically shaped stator with a cylinder top surface, a cylinder bottom surface, a smooth outer surface, and an inner surface including a plurality of slots spaced circumferentially along said inner surface;
   b. a plurality of conductive coils wound toroidally along said stator inner surface, across said cylinder bottom surface, along said stator outer surface, and across said cylinder top surface so that each coil of said plurality of coils forms a loop positioned in each of said plurality of stator slots to substantially completely fill said slots, thereby forming an outside-wound stator wherein each coil has two terminals and producing a high number of phases and a low base pole count;
   c. a cylindrical rotor with a substantially smooth facing surface mounted for rotation relative to said stator internally of said stator inner surface and concentric with said stator to form a uniform gap between said rotor facing surface and said stator inner surface; and
   d. drive means for supplying a source of alternating current to provide more than three drive phases to said plurality of coils, wherein said drive means is configured to operate with variable harmonic drive to produce an impedance effect.

2. The AC machine of claim 1, wherein a plurality of slots is spaced along said outer surface of said stator.

3. The AC machine of claim 1, wherein each of said coils is independently driven by a unique dedicated drive means.

4. The AC machine of claim 1 wherein a selected number of said plurality of coils have the same phase angle as one another, are positioned in different poles, and are connected together to the same drive means.

5. The AC machine of claim 1 wherein at least two of said plurality of coils have a 180 electrical degree phase angle difference between them and are connected in anti-parallel to the same drive means.

6. The AC machine of claim 1 wherein said plurality of coils are connected to said drive means with a star connection.

7. The AC machine of claim 1, wherein said plurality of coils are connected to said drive means with a mesh connection.

8. The AC machine of claim 7 wherein said plurality of coils are wound to have a short pitch.

9. The AC machine of claim 7 wherein said each of said plurality of coils is independently driven by a unique dedicated drive means.

10. The AC machine of claim 1, wherein coils in said plurality of coils are connected so that said coils produce a pole count of 2 or 4 under first harmonic operation.

11. The AC machine of claim 1, wherein coils in sets of said plurality of coils are connected together in series, parallel, or anti-parallel.

12. The AC machine of claim 1, wherein said stator has a shorter stator slot length than stator diameter.

13. The AC machine of claim 1, wherein said rotor is mounted concentrically with and spaced outwardly of said stator outer surface.

14. The AC machine of claim 1, wherein said machine is configured to have an axial flux configuration or a radial flux configuration.

15. The AC machine of claim 1, wherein said rotor comprises a structure with at least two active sections, each of said active sections positioned to face a surface of said stator.

16. The AC machine of claim 15 wherein one active section faces the outer surface of said stator and a second active section faces the inner surface of said stator, wherein said two active sections are connected together with a join.

17. The AC machine of claim 16 further comprising at least one more stator and rotor, wherein said stators and rotors are interleaved together.

18. The AC machine of claim 15, wherein said rotor includes one active section normal to a second active section and to a surface of said stator.

19. The AC machine of claim 1, wherein said machine is a motor.

20. The AC machine of claim 1, said machine is a generator.

21. The AC machine of claim 1, wherein said machine is selected from the group consisting of: a pole count changing alternating current machine, a synchronous machine with variable pole count rotor, and a permanent magnet machine with a rotor which reacts to both fundamental and harmonic components of a drive waveform.

22. The AC machine of claim 1, wherein each coil in said plurality of coils is wound with a high degree of precision to substantially completely fill each of said slots and to produce a base pole count that enables said machine to react to a great variation of harmonic drives.

23. The AC machine of claim 1, further comprising a second cylindrical rotor mounted for rotation externally of said stator and electrically connected to said cylindrical rotor through a join that enables said rotors to spin in synchrony relative to said stator, wherein said join is configured to be an axial flux rotor, wherein said machine has three rotors rotating in synchrony.

24. The AC machine of claim 1, wherein said plurality of coils is toroidally wound to have a low base pole count of B=2, wherein B represents the number of magnetic poles developed by a machine driven by fundamental frequency H=1, wherein H represents harmonic order.

25. The AC machine of claim 1, wherein said plurality of coils is toroidally wound to have a pole count of B>2, wherein B represents the number of magnetic poles developed by a machine driven by fundamental frequency H=1, wherein H represents harmonic order.

* * * * *